Nov. 7, 1967 E. GERUM 3,351,833
COMPENSATED TRANSISTORIZED ELECTRIC CLOCK CIRCUIT
Filed May 31, 1966 2 Sheets-Sheet 1
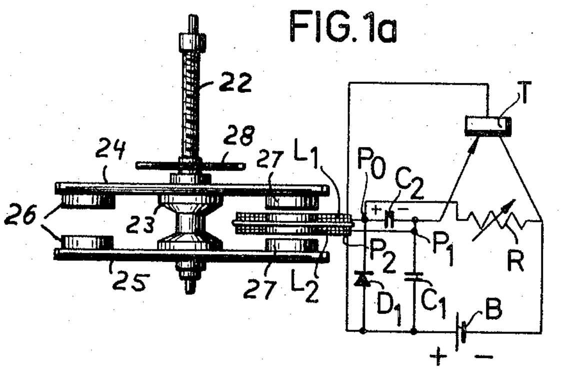
FIG. 1a
FIG. 1
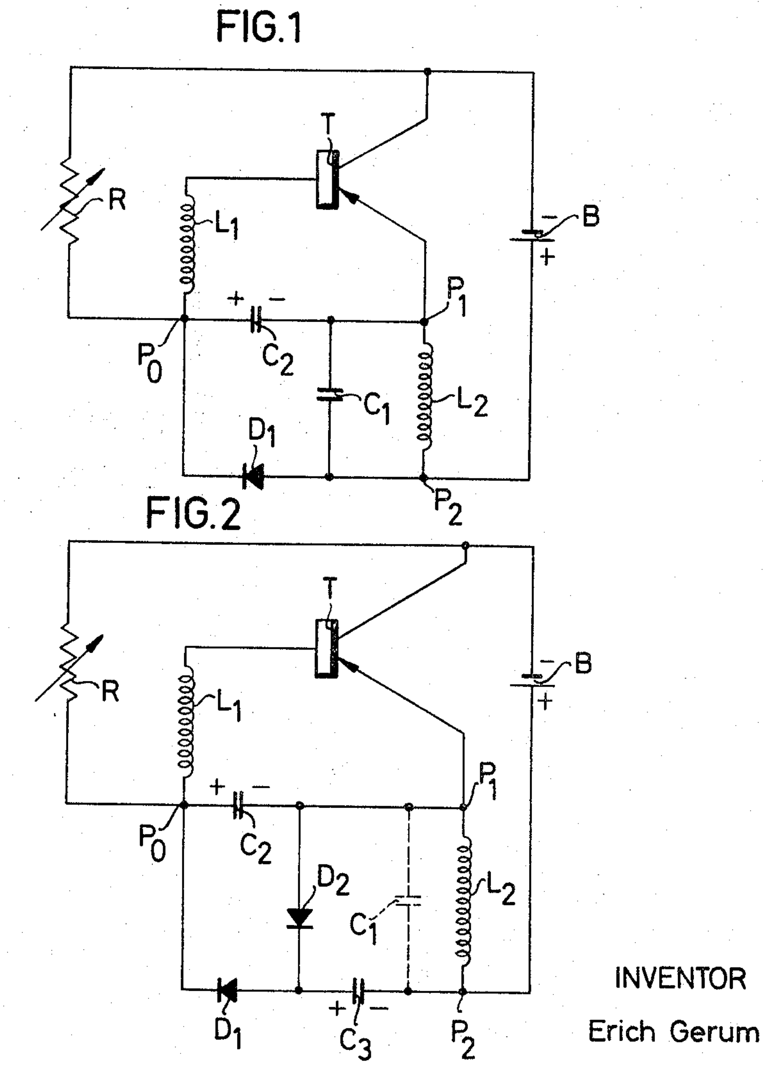
FIG. 1, FIG. 2
INVENTOR
Erich Gerum
By [signature]

COMPENSATED TRANSISTORIZED ELECTRIC CLOCK CIRCUIT

Filed May 31, 1966 2 Sheets-Sheet 2

INVENTOR
Erich Gerum

By [signature]

United States Patent Office 3,351,833
Patented Nov. 7, 1967

3,351,833
COMPENSATED TRANSISTORIZED ELECTRIC CLOCK CIRCUIT
Erich Gerum, Rothenbach (Pegnitz), Germany, assignor to Diehl, Nurnberg, Germany
Filed May 31, 1966, Ser. No. 554,164
Claims priority, application Germany, June 29, 1962, D 39,257
6 Claims. (Cl. 318—132)

ABSTRACT OF THE DISCLOSURE

Drive circuit for removable input member of a clock motor having a transistor with a control coil in the base-emitter circuit in which voltage pulses are developed by movement of the member and having a drive coil in the emitter-collector circuit in series with a direct current voltage source which exerts drive pulses on the member when the transistor conducts and in which circuit a bias opposite that required to open the transistor is supplied to the control coil from the collector-emitter circuit and of a value which varies directly with the variation in voltage of the voltage source between a predetermined minimum voltage and the maximum voltage thereof.

This is a continuation-in-part-application of my co-pending patent application Ser. No. 286,220 filed June 7, 1963, and entitled, "Compensated Transistorized Electric Clock Circuit," and now abandoned.

The present invention relates to transistor circuit amplifiers especially for application in self-regulating clock drives.

Transistors, junction transistors in particular, are employed to an increasing degree in circuit amplifiers because of their advantageous properties. They can for example be used with advantage in electrical impulse or oscillation generators and also as active amplifying elements in connection with rotating or oscillating mechanical systems in order to maintain an oscillating or rotary movement. They are, among other things, also employed as circuit amplifiers in self-regulating clock drives.

It is known, for example, for a transistor circuit amplifier to be provided for the maintenance of a mechanical oscillation or rotary movement, in which a control coil has been provided between the base and the emitter of the transistor and an operating coil has been provided between the collector and the emitter of the transistor and in which, in series with the operating or working coil, a direct current source, in particular a dry battery, is positioned. In this way, a voltage impulse produced in the control coil develops an amplified impulse in the working coil, which impulse can be employed for the maintenance of the oscillation or rotary movement. Such as system can either, via permanent magnets, operate a movement regulator, for example a pendulum or a balance wheel, but it can also, preferably in connection with permanent magnets, form the driving system of a periodically or permanently rotating motor which, for example via a buffer spring, is utilized for the drive of a clock.

In all these cases, the problem is to drive a clock for a long period of time by means of a dry battery, in particular a single cell while the current in the working coil must be kept as constant as possible. This requirement cannot be fulfilled in a simple manner with the transistor circuits existing today. The reason for this lies primarily in the fact that, in the already-known circuit amplifiers equipped with a transistor, the emitter current or the collector current is to a great extent dependent upon the voltage applied to the transistor and upon the temperature. As long as it is fresh, the operating voltage of a dry battery amounts to about 1.7 volts, but decreases with increasing exhaustion and age, at a still-sufficient current supply, to about 0.8 volt. Also, in a living room, the temperature varies between about 10 and 30 degrees centigrade. The change evoked by these influences in the emitter current or collector current of the transistor causes changes in the drive-performance which encroach upon the time-constant of such installations and make necessary more or less expensive and complicated compensating devices.

It is further known, in order to obtain a periodical effect, to provide a capacitor in the connecting lead between the base and the emitter of the transistor, and to connect the base feed to the collector via a high-ohmic resistance. By these means however, it is not possible to obtain a compensation for the effect of the operating voltage on the performance of the operating coil.

It is, therefore, an object of the present invention to provide a transistor circuit amplifier especially for operating self-regulating clock drives which will overcome the disadvantages outlined above.

It is a further object of the present invention to provide a transistor circuit as set forth in the preceding paragraph, in which the current in the operating or working coil will be held approximately constant.

It is still another object of the present invention to provide a transistor circuit of the type set forth in the preceding paragraphs, in which the emitter or collector current will not be dependent on the variable voltage of the voltage source, and will not be dependent on the temperature of the transistor.

These and other objects and advantages of the present invention will appear more clearly from the following specification in connection with the accompanying drawings in which:

FIG. 1 illustrates a transistor circuit amplifier in accordance with the present invention with one diode;

FIG. 1*a* shows a balance oscillator in connection with the circuit amplifier according to FIG. 1;

FIG. 2 shows a transistor circuit amplifier similar to that of FIG. 1, but with two diodes;

Figure 3:
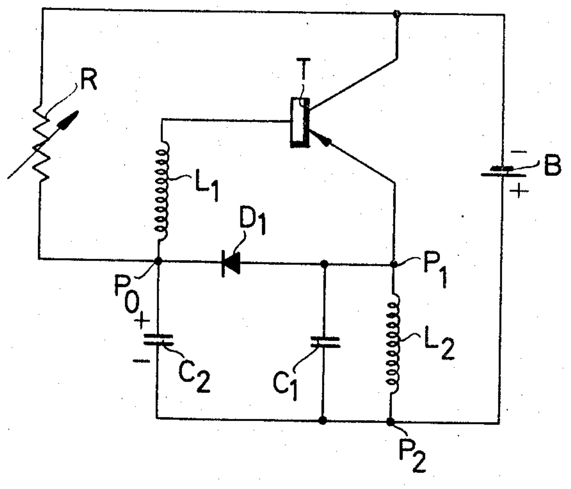
FIG. 3 shows a variation of the construction according to FIG. 1.

The present invention is based on a transistor circuit amplifier, especially for employment with self-regulating clock drives, in which first, in the load circuit of the amplifier, a non-constant direct current source, more particularly a dry battery, has been provided as the source of energy, in which secondly a control coil has been provided between the base and the emitter of the transistor, and in which thirdly the circuit impulses produced in the load circuit serve to drive a mechanically oscillating or rotating system through the movement of which control impulses are periodically fed to the transistor, while a capacitor is located between the control coil and the working coil.

In order to avoid the disadvantages referred to above, it is suggested in conformity with the present invention to connect that plate of the capacitor which is connected to the control coil, with that end of the working coil which is not connected to the other plate of the capacitor through the intervention of a diode, said diode being poled in such a way that the voltage applied to the capacitor will operate at the base of the transistor as a blocking potential that is dependent on the voltage of the voltage source. According to a further feature of the present invention, the blocking potential applied to the base of the transistor can be doubled, if an additional capacitor is arranged in series with said diode and if that plate of the additional capacitor which is connected to said diode is conductively connected to the other end of the working coil via an additional diode.

Referring now to the drawings in detail, in FIG. 1, T designates a pnp-junction transistor in the control circuit of which between the base and the emitter there is provided a control coil $L_1$. Between the collector and the emitter of transistor T there is arranged an operating or driving coil $L_2$ in series with a direct voltage source B. In a manner known per se the two ends of working coil $L_2$ are interconnected by a small capacitor $C_1$.

With the construction shown in FIG. 1 that end of the control coil $L_1$ which is not connected to the base of transistor T is connected through a point $P_0$ to the emitter feed via a capacitor $C_2$ of a suitable size. Furthermore, this end of the control coil $L_1$ is connected with the collector via a high-ohm resistance R. It is advantageous to make the resistance R adjustable. That end of the working coil $L_2$ which is not connected to the emitter, is connected via a point $P_2$ to point $P_0$ through the intervention of a diode $D_1$ made, for example of germanium or silicon.

The circuit of FIG. 1 is arranged in association with a balance oscillating member 23 forming the input member of an electric clockwork. Member 23, which is under the influence of a spiral spring 28 is intended to drive a clock hand mechanism, for instance, via a drive worm 22. Member 23 has two spaced parallel arms 24, 25 having their ends provided with permanent magnets 27 and balance weights 26. Member 23 is mounted for oscillation on an axis lateral of control coil $L_1$ and the operating coil $L_2$ arranged coaxially thereto, with the ends of arms 24 and 25 arranged to pass across the coils.

In the example of FIG. 2, a further capacitor $C_3$ has been provided in the feed between the working coil $L_2$ and the diode $D_1$, and also another diode $D_2$ is disposed between the point $P_1$ and the lead connecting the capacitor $C_3$ and the diode $D_1$.

The method of operation of the circuit shown in FIGS. 1 and 2 is therefore as follows:

It is assumed that voltage impulses are periodically produced in the control coil $L_1$ by means of the moving permanent magnets 27, by which impulses the base of the transistor alternately receives a positive or negative potential in relation to the emitter. In a pnp-transistor the collector-emitter section becomes conductive with a sufficiently high negative voltage at the base. Because of the base current occurring thereby, the plate of the capacitor $C_2$ connected to the base is charged positively. On the other hand, in a conductive state of the transistor T, practically the total voltage of the battery lies across the working coil $L_2$. In this way the point $P_1$ and consequently the righthand plate of the capacitor $C_2$ receives a negative voltage. Further, the resistance R must be selected so high that in view of the voltage impulse produced in the control coil $L_1$, the transistor is still fully conductive if a negative voltage prevails at the base of the transistor.

If now the point $P_2$ of the working coil $L_2$ is connected to point $P_0$ via the diode $D_1$, then the point $P_0$, depending on the battery voltage, receives an additional positive potential in conformity with the magnitude of the battery voltage. The current supplied via the diode $D_1$ thus increases the positive potential in point $P_0$ and thereby also at the base of the transistor in conformity with the magnitude of the voltage of the battery B. The resistance R is so adjusted that, for instance with a new battery and a voltage of 1.7 volts, a current of just sufficient magnitude is produced in the working coil $L_2$. If now in the course of time the battery voltage drops, the positive potential at the base of the transistor is also reduced so that its resistance becomes smaller in the conductive state. Thus, because of the diode $D_1$, the effect of the variable battery voltage upon the current in the working coil $L_2$ is to a large extent compensated for.

The effect of the diode $D_1$ is almost doubled in the embodiment of FIG. 2. Use is here made of the fact that, in the blocking phase of the transistor because of the effect of the permanent magnet on the working coil $L_2$, the point $P_1$ of the circuit receives a positive voltage which results in a flow of current via diode $D_2$ to the lefthand plate of the capacitor $C_3$. In the subsequent opening phase of the transistor T a negative voltage again appears at $P_1$ and a positive voltage appears at the other pole $P_2$ of the working coil $L_2$, so that now the capacitor $C_2$ is charged via the diode $D_1$. Thus, the point $P_0$ receives a considerably higher voltage than in the embodiment according to FIG. 1. Apart from this, the method of operation of the device of FIG. 2 is the same as in the example according to FIG. 1.

With the circuit illustrated in FIG. 3, merely the positions of the capacitor $C_2$ and the diode $D_1$ have been exchanged. This means that for the production of the blocking potential at the point $P_0$ merely the impulse voltage occurring in the working coil $L_2$ is utilized during the blocking phase of the transistor.

Figure 4:
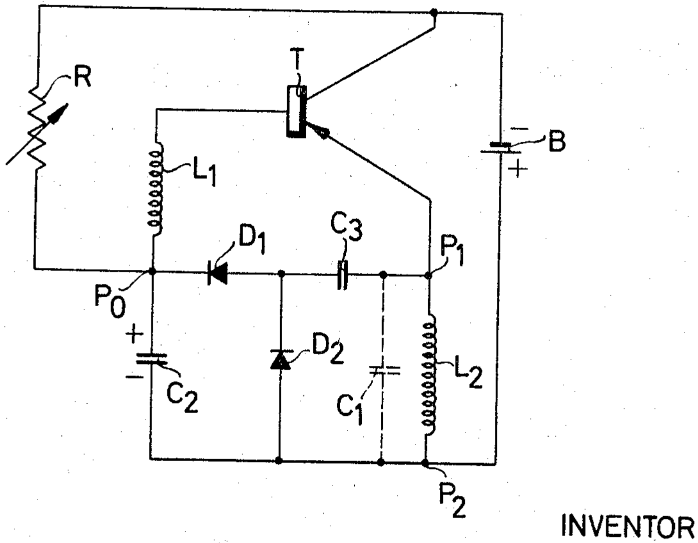
FIG. 4 shows a variation of the construction according to FIG. 2.

In the circuit illustrated in FIG. 4, as also in the example according to FIG. 2, a further capacitor $C_3$ has been provided in the connecting lead between the emitter and the control coil $L_1$, and a diode $D_2$ has been interposed between $P_2$ and a point between the diode $D_1$ and the plate of the capacitor $C_3$ connected with $D_1$ so that also here, as in the example in FIG. 2, a current to produce a positive blocking potential is taken from the working coil $L_2$ during the blocking phase and during the opening phase of the transistor.

It is to be understood that the present invention is not limited to the embodiments illustrated in FIGS. 1 to 4. Thus for example, the compensation voltage may be supplied directly to the base of the transistor instead of being supplied to the point $P_0$ positioned between the resistor R and that end of the control coil $L_1$ not connected to the base of the transistor.

Figure 5:
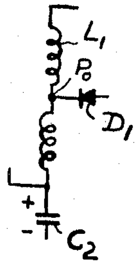
FIG. 5 shows a portion of a circuit slightly modified over that of FIG. 4.

Further, it is also possible to provide the connecting point $P_0$ at any point on the control coil $L_1$ and to give that part of the control coil $L_1$ which lies between this point and the corresponding plate of the capacitor $C_2$ a reversed direction of winding so that an additional compensating effect will be obtained because the current impulse which charges capacitor $C_2$ via diode $D_1$ causes a feed-back in the control coil $L_1$ (FIG. 5).

According to a further embodiment, with a suitable dimensioning of the capacitor $C_1$ and a slight feed-back between the coils $L_2$ and $L_1$, above a certain working current, it is possible to produce in the control coil $L_2$ a blocking oscillation of a higher frequency, by means of which, when exceeding a certain current in the working coil $L_2$, a blocking oscillation occurs which reduces the power produced by the working coil.

The circuits suggested also provide to a great extent a temperature compensation due to the fact that with increasing temperature and growing conductivity of the base-emitter section of the transistor the conductivity of the diode $D_1$ also increases so that an increase of the positive potential acting counter to the current increase on the working coil $L_2$ will occur at the base.

In the circuits described, the transistor can be made of germanium, silicon or other semi-conductive material. A germanium transistor is distinguished by a particularly small current consumption and favorable oscillation build-up conditions. The diode may likewise consist of germanium, silicon or other semi-conductive material. Very favorable conditions have been obtained by employing a germanium transistor in connection with a silicon diode. The silicon diode results in a notable current in the direction of passage only from a relatively high voltage on so that not until a certain battery voltage is exceeded, does a compensation effect occur by means of the diode.

It is, of course, to be understood that the present invention is by no means limited to the particular arrangements shown in the drawing, but also comprises any modifications within the scope of the appended claims.

What I claim is:

1. A transistorized circuit for a mechanism having a moveable member, especially for an electric clockwork, which comprises: a transistor having a base, an emitter, and a collector; a direct current source which tends to decrease in voltage over a period of time; a working coil; said direct current source and said working coil being arranged in series between said collector and said emitter with said source adjacent said collector and said working coil adjacent said emitter; said working coil being operable when supplied with current impulses from said source to impart driving impulses on said moveable member; a control coil having one end connected to said base and means connecting the other end of said control coil to said emitter, movement of said member being operable to supply controlling voltage pulses to said base to thereby control the conductivity of said transistor and the supply of current pulses to said working coil; said means connecting the other end of said control coil to said emitter comprising voltage dependant diode means connected between said other end of said control coil and one end of said working coil and poled in a direction to supply a bias to said other end of said control coil during the off period of said transistor which is opposite to that which will open the transistor, said diode means being conductive at a minimum voltage greater than the lowest voltage to which said source drops over a period of time but less than the maximum voltage of said source, and condenser means connected in parallel relation with said diode means and at least one condenser having one side connected to the other end of said working coil.

2. A circuit according to claim 1 in which said diode means comprises a single diode connected between said other end of said control coil and one end of said working coil, and said condenser means comprises a first condenser connected between said other end of said control coil and the other end of said working coil and a second condenser connected in parallel with said working coil.

3. A circuit according to claim 1 in which said diode means comprises first and second diodes in series between said other end of said control coil and one end of said working coil, and said condenser means comprises a first condenser connected between said other end of said control coil and said one end of said working coil and a second condenser connected between the other end of said working coil and the junction point of said diodes.

4. A circuit according to claim 1 in which said diode means comprises a single diode connected between said other end of said control coil and one end of said working coil, and said condenser means comprises a first condenser connected between said other end of said control coil and the other end of said working coil and a second condenser connected in parallel with said working coil.

5. A circuit according to claim 1 in which a resistor is provided connected between said other end of said control coil and the collector of said transistor.

6. A circuit according to claim 5 in which a third coil wound reversely to said control coil and adjacent thereto is serially connected between said control coil and said resistor.

References Cited

UNITED STATES PATENTS

| | | | |
|---|---|---|---|
| 2,831,114 | 4/1958 | Van Overbeek | 318—132 X |
| 2,957,116 | 10/1960 | Hurd et al. | 318—132 |
| 2,986,683 | 5/1961 | Lavet et al. | 318—132 |
| 3,040,225 | 6/1962 | Reich | 318—132 |
| 3,100,278 | 8/1963 | Reich | 318—132 X |
| 3,118,098 | 1/1964 | Reich | 318—132 X |
| 3,134,220 | 5/1964 | Meisner | 58—28 |
| 3,238,431 | 3/1966 | Raval | 318—130 |

MILTON O. HIRSHFIELD, *Primary Examiner.*

D. F. DUGGAN, *Assistant Examiner.*